UNITED STATES PATENT OFFICE.

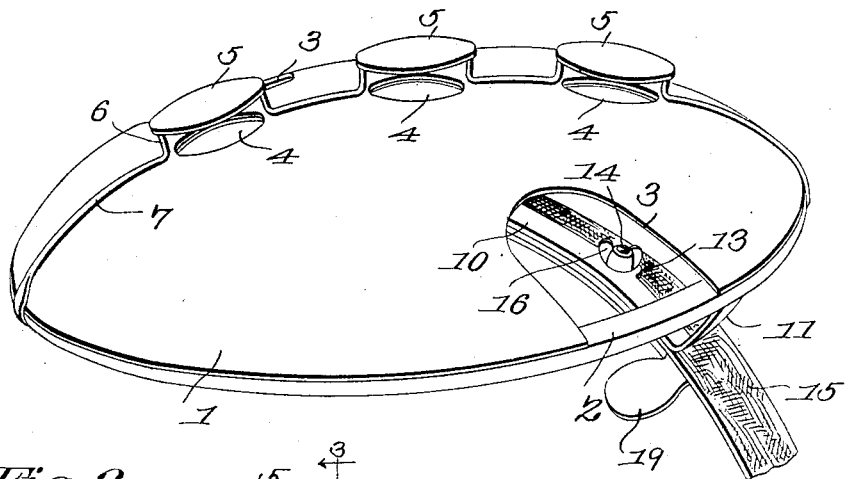
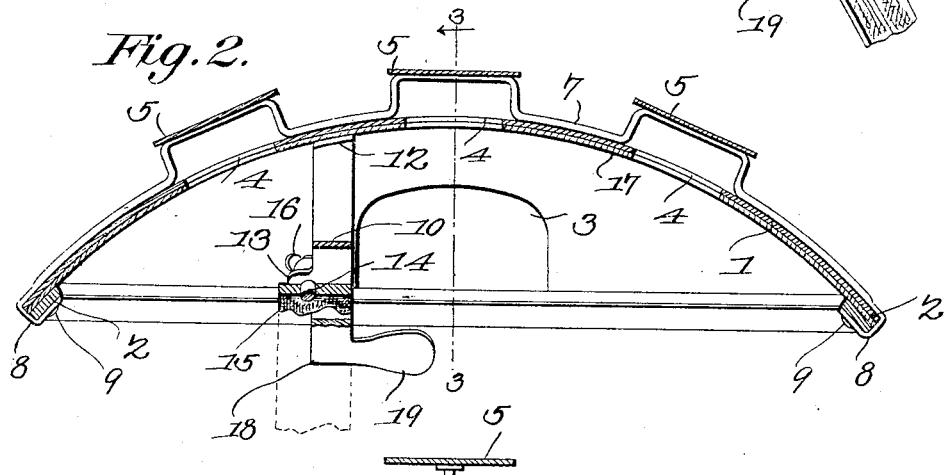
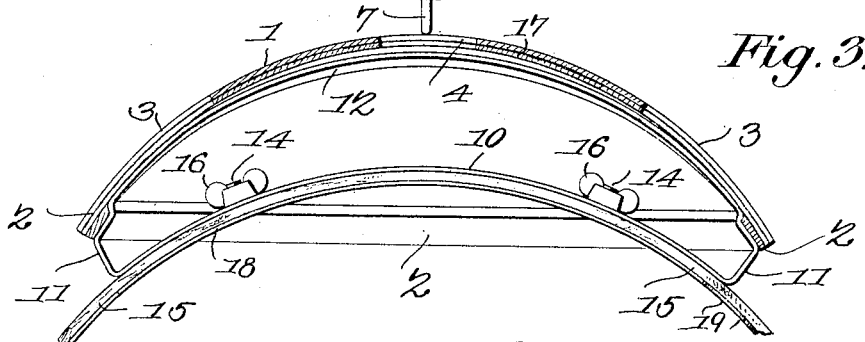

CHARLES S. MOORE, OF FORT PIERCE, FLORIDA.

HORSE-BONNET.

No. 803,616.  Specification of Letters Patent.  Patented Nov. 7, 1905.

Application filed May 8, 1905. Serial No. 259,463.

*To all whom it may concern:*

Be it known that I, CHARLES S. MOORE, a citizen of the United States, residing at Fort Pierce, in the county of Brevard and State of Florida, have invented a new and useful Horse-Bonnet, of which the following is a specification.

This invention relates to horse-bonnets, and has for its object to provide an improved device of this character for shielding the head of the animal from the rays of the sun and at the same time to afford proper ventilation between the bonnet and the head of the animal to permit of the escape of animal heat from beneath the bonnet.

A further object of the invention is to materially simplify the device so as to permit of the convenient application and removal of the same, to avoid annoyance to the animal, and to render the device strong, durable, and inexpensive.

With these and other objects in view, the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the accompanying drawings, Figure 1 is a perspective view of a horse-bonnet embodying the features of the present invention. Fig. 2 is a longitudinal sectional view of the device. Fig. 3 is a cross-sectional view on the line 3 3 of Fig. 2.

Like characters of reference designate corresponding parts in each and every figure of the drawings.

The body 1 of the present device is preferably elliptical in shape and bowed or arched, so as to produce a concavo-convex body which is stiffened throughout its peripheral edge by a band or ring 2, which is soldered or otherwise connected to the body 1. By preference the body is formed of a comparatively thin sheet of zinc to render the device both strong and light. Zinc also has the advantage over other sheet metals in that it is a poor conductor of heat. At opposite ends of the minor axis of the body of the bonnet there are openings 3, through which the ears of the animal are designed to extend. A series of ventilating-openings 4 are formed through the top of the bonnet along its major axis, and above each of these openings is a shield 5, somewhat greater in diameter than the opening and held above the opening by means of a supporting yoke or arch 6, the several yokes or arches being bent from a single bar 7, which extends from end to end of the bonnet, with each end bent around the adjacent edge portion of the bonnet and the ring 2, as shown at 8, and secured thereto by means of a suitable fastening 9. Just in rear of the ear-openings 3 there is a supporting cross-bar 10, which is bowed or arched upwardly within the bonnet, so as to fit across the top of the head of an animal, the ends of the cross-bar being bent upwardly, as at 11, into engagement with the stiffening ring or band 2, to which they are connected in any suitable manner and from which the ends arch upwardly across and in intimate contact with the under side of the bonnet, as shown at 12, and constituting a brace for the bonnet. At opposite sides of the longitudinal axis of the bonnet the cross-bar 10 is provided with rear extending ears, one of which has been shown at 13, said ear being provided with a perforation for the reception of a fastening 14, which connects the cross-bar to the head strap or stall 15 of a bridle, there being a thumb-nut 16 fitted to the upper projecting end of the fastening, so as to detachably hold the bonnet upon the headstall of the bridle.

In using the device the arched cross-bar 10 is fitted upon the top of the head stall or strap of a bridle and secured thereto by means of the fastenings 14 and the thumbscrews 16, whereupon the device is in readiness to be fitted to an animal with the bridle, the ears of the animal of course being passed through the ear-receiving openings 3. The cross-bar 10 of course rests transversely across the top of the head of the animal and thereby supports the bonnet above the head to permit of the necessary circulation of air, and thereby enable the escape of the animal heat beneath the peripheral edge of the bonnet and also upwardly through the ventilating-openings 4. These openings 4 being covered by the elevated covers 5 of somewhat greater diameter than the openings, the sun's rays are effectually prevented from shining through the openings upon the head of the animal. As the body of the bonnet is formed of zinc, which is a comparatively poor conductor of heat, the head of the animal is subjected to little or no heat by radiation from the bonnet, wherefore the head of the animal is maintained in a comparatively cool condition in a very simple and inexpensive manner. As the bonnet is supported upon the headstall or strap of the bridle, it does not offer any annoyance whatsoever to the animal and is always maintained in place. When not desired for use, the bonnet may be conveniently removed by disconnecting the fastenings, and therefore it will be understood that the application and removal of the device does not impair the bridle.

It is proposed to line the zinc body of the bonnet with wood, (shown at 17,) preferably in the nature of veneer, whereby a comparatively thin covering or body of zinc may be employed, which reduces the cost and also the weight of the bonnet.

In addition to the cross-bar 10 it is proposed to employ a lower corresponding cross-bar 18, between which and the upper cross-bar 10 the headstall of a bridle is designed to be clamped by the clamping-nuts 16, each end of the lower member 18 being extended forwardly and laterally enlarged, as shown at 19, so as to form a rest or brace to engage the top of the head of the horse in advance of the cross-bar 18, and thereby prevent tilting and looseness of the bonnet.

Having fully described the invention, what is claimed is—

1. A horse-bonnet comprising a concavo-convex body, an arched cross-bar having its ends extending upwardly and connected to the body, and means for connecting the cross-bar to the headstall of a bridle.

2. A horse-bonnet having a series of ventilating-openings, a bar secured across the bonnet with intermediate portions arched to span the openings, and covers supported upon the arched portions of the bar above the openings and of greater diameters than the latter.

3. A horse-bonnet comprising a concavo-convex body provided at opposite sides with ear-openings and a series of ventilating-openings disposed longitudinally of the body, a stiffening-ring secured to the peripheral edge of the body, covers supported above the openings and of greater diameters than said openings, an arched cross-bar extending across the under side of the body in rear of the ear-receiving openings, and fastenings carried by the cross-bar for connecting the same to the headstall of a bridle.

4. A horse-bonnet comprising a body, an arched cross-bar connected to the under side of the body and provided with laterally-directed brace members to rest upon the head of the horse, and means for connecting the cross-bar to the headstall of a bridle.

5. A horse-bonnet comprising a body, an arched cross-bar connected to the under side of the body, a lower arched cross-bar coöperating with the first-mentioned cross-bar to form a clamp, the ends of the lower cross-bar being extended laterally and formed into braces to rest upon the top of a horse's head, and adjustable fastenings connecting the two cross-bars to clamp the same upon the headstall of a bridle.

In testimony that I claim the foregoing as my own I have hereto affixed my signature in the presence of two witnesses.

CHARLES S. MOORE.

Witnesses:
J. S. KECK,
JOHN SÖRENSEN.